(12) United States Patent
Fu (10) Patent No.: US 7,730,253 B2
(45) Date of Patent: Jun. 1, 2010

(54) SYSTEM AND METHOD FOR CONTROLLING ACCESS TO A MEMORY DEVICE OF AN ELECTRONIC DEVICE

(75) Inventor: Runbo Fu, Kanata (CA)

(73) Assignee: Research in Motion Limited, Waterloo, Ontario (CA)

( * ) Notice: Subject to any disclaimer, the term of this patent is extended or adjusted under 35 U.S.C. 154(b) by 542 days.

(21) Appl. No.: 11/563,271

(22) Filed: Nov. 27, 2006

(65) Prior Publication Data

US 2008/0126675 A1 May 29, 2008

(51) Int. Cl.
*G06F 12/14* (2006.01)
(52) U.S. Cl. .................. 711/103; 711/152; 711/163
(58) Field of Classification Search .............. None
See application file for complete search history.

(56) References Cited

U.S. PATENT DOCUMENTS 6,321,314 B1 * 11/2001 Van Dyke .................. 711/163
6,330,648 B1 12/2001 Wambach et al.
7,284,106 B1 * 10/2007 Fernald ..................... 711/163

FOREIGN PATENT DOCUMENTS

| WO | WO 93/09495 | * | 5/1993 |
| WO | WO 02/27445 |   | 5/2002 |

OTHER PUBLICATIONS

Samsung OneNAND Flash, Sep. 2006. pp. 1-4.*
Samsung OneNAND Flash, Sep. 2006.

* cited by examiner

*Primary Examiner*—Than Nguyen
(74) *Attorney, Agent, or Firm*—McCarthy Tétrault LLP (57) ABSTRACT

The invention relates to a system and method for controlling implementation of a command to a memory device. In the method, it comprises the following steps: monitoring an instruction stream destined for the memory device for an assertion of a command for the memory device; if the command is detected, evaluating whether the command is a restricted command; and if the command is a restricted command, preventing assertion of the command on the memory device.

17 Claims, 6 Drawing Sheets

Fig. 5 ced by the embodiment of FIG. 1 in controlling access to the memory device.

SYSTEM AND METHOD FOR CONTROLLING ACCESS TO A MEMORY DEVICE OF AN ELECTRONIC DEVICE

The invention described herein relates to a system and method for controlling access to a memory device of an electronic device. In particular, it relates to controlling or inhibiting a command that would modify contents of a secure sector in the memory device. The secure sector may be a boot sector containing operational code for the device.

BACKGROUND

Wireless handheld mobile communication devices perform a variety of functions to enable mobile users to stay organized and in contact with others through e-mail, schedulers and address books. More sophisticated electronic devices invariably have a microprocessor or microcontroller and accompanying software or firmware to control at least part of their operations. In portable devices, the software or firmware need to be stored locally on the devices in their local memory device(s). One critical piece of software or firmware is the code used to boot the electronic device. This boot code is typically stored in the boot sector in the memory of the device. It is preferable that the boot sector, and perhaps other sectors, be write-protected. This helps to prevent data in those sectors from being overwritten by a write or clear command initiated from erroneous or malicious software operating on the electronic device.

Frequently, flash memory devices are used in portable electronic devices to store the software of firmware. There are two common designs for flash memory devices: NOR and NAND flash. NOR flash devices have been used in portable electronic devices; however, NAND flash devices are typically cheaper and provide greater storage densities than corresponding NOR flash devices. However, the architecture of a NAND flash device does not provide a write-protect feature for specific locations in the device. This can be problematic for software or firmware stored in the boot sector.

There is a need for a system and method which addresses deficiencies in the prior art.

BRIEF DESCRIPTION OF THE DRAWINGS

Embodiments of the invention will now be described, by way of example only, with reference to the accompanying drawings, in which.

DETAILED DESCRIPTION OF AN EMBODIMENT

The description which follows and the embodiments described therein are provided by way of illustration of an example or examples of particular embodiments of the principles of the present disclosure. These examples are provided for the purposes of explanation and not limitation of those principles and of the invention. In the description which follows, like parts are marked throughout the specification and the drawings with the same respective reference numerals.

In a first aspect of an embodiment, a method for controlling assertion of a command to a memory device in an electronic device is provided. The method comprises: monitoring an instruction stream destined for the memory device for an assertion of a command for the memory device; if the command is detected, evaluating whether the command is a restricted command; and if the command is a restricted command, preventing assertion of the command on the memory device.

In the method, evaluating whether the command is a restricted command may comprise: determining whether the command modifies contents of the memory device; and if the command does not modify contents of the memory device, then indicating that the command is not a restricted command. Additionally or alternatively, if the command does not modify contents in the memory device, then the method may allow processing of the command to continue or may not indicate anything about the command.

In the method, if the command modifies the contents of the memory device, then the method may evaluate a destination address associated with the command. If the destination address is not a restricted address for the memory device, then the method may indicate that the command is not a restricted command; and if the destination address is a restricted address for the memory device, then the method may indicate that the command is a restricted command.

In the method, if the command is a restricted command, then a write protect pin on the memory device may be asserted to prevent the command from being asserted on the memory device.

In the method, the memory device may be a NAND-gate based memory device; and the electronic device may be a portable communication device.

In the method, the restricted address may relate to initiation instructions for the electronic device. Alternatively or additionally, the address may contain sensitive information for the device.

The method may be selectively activated and deactivated.

In a second aspect, a controller for monitoring for assertion of a command to a memory device in an electronic device is provided. The controller comprises: a monitoring module; a evaluation module and an output module. The monitoring module monitors an instruction stream for a command, where the stream is generated by a microprocessor in the device and the stream destined for the memory device. In the evaluation module, after the command is detected, the evaluation module evaluates whether the command is a restricted command. If the command is a restricted command, the output module generates a signal that is asserted against the memory device to prevent assertion of the command on the memory device.

In the controller, the evaluation module may evaluate whether the command is a restricted command by: determining whether the command modifies contents of the memory device. If the command does not modify contents of the memory device, then the controller may indicate that the command is not a restricted command; and if the destination address is a restricted address for the memory device, then the controller may indicate that the command is a restricted command. Additionally or alternatively, if the command does not modify contents in the memory device, then the controller may allow processing of the command to continue or may not indicate anything about the command.

In the controller, the evaluation module may further: evaluate a destination address associated with the command; and if the destination address is not a restricted address for the memory device, then the module may indicate that the command is not a restricted command.

In the controller, the output module may generate a signal for a write protect pin on the memory device to prevent the command from being asserted on the memory device if the command is identified as being the restricted command.

For the controller, the memory device may be a NAND-gate based memory device; the controller may be incorporated into the microprocessor; and the electronic device may be a portable communication device.

For the controller, the restricted address may contain data related to initiation instructions for the electronic device.

The controller may be selectively activated and deactivated.

In other aspects, various combinations of sets and subsets of the above aspects are provided.

Generally, an embodiment provides a system and method for inhibiting specific, restricted commands from being executed on a memory device. Commands can be inhibited at a global level or when commands are attempting to access specific sectors in the memory device. For the embodiment, it is necessary to identify the inhibited commands and any further restriction details (such as memory addresses or conditions under which the command can and cannot be executed). In one embodiment, information relating to the inhibited commands is accessed by a controller. The controller is located in a device such that the controller can monitor and/or intercept commands as they are provided to a target memory device, preferably in real time. As the controller analyses the commands and/or the related address for the commands, if it recognizes a restricted command, the controller may block the command from being executed on the memory device. Alternatively, the memory device may be temporarily disabled during the assertion of the command. As such, access to sensitive locations of the memory device can be controlled, thereby shielding their contents from tampering.

Exemplary details of embodiments are provided herein. First, a description is provided on general concepts and features of an embodiment and its related memory devices. Then, further detail is provided on exemplary memory controllers related to an embodiment.

Figure 1:
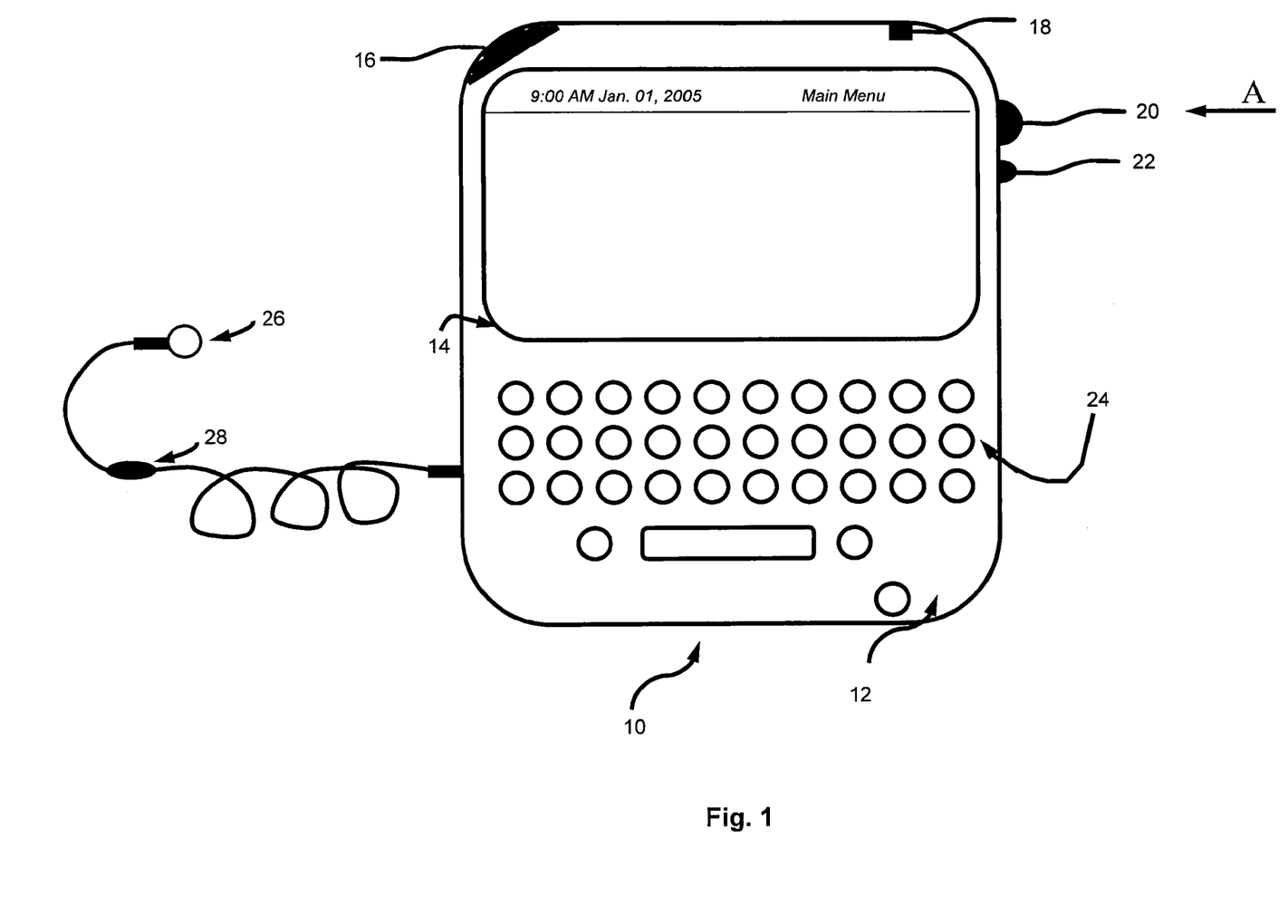
FIG. 1 is a schematic representation of an electronic device having a memory controller and a memory device in accordance with an embodiment.

FIG. 1 provides general features of an electronic device for receiving electronic communications in accordance with an embodiment of the invention, which is indicated generally at 10. In the present embodiment, electronic device 10 is based on a computing platform having functionality of an enhanced personal digital assistant with cellphone and e-mail features. It is, however, to be understood that electronic device 10 can be based on construction design and functionality of other electronic devices, such as smart telephones, desktop computers, pagers or laptops having telephony equipment. In a present embodiment, electronic device 10 includes a housing 12, an LCD 14, speaker 16, an LED indicator 18, a trackball 20, an ESC ("escape") key 22, keypad 24, a telephone headset comprised of an ear bud 26 and a microphone 28. Trackball 20 and ESC key 22 can be inwardly depressed along the path of arrow "A" as a means to provide additional input to device 10.

It will be understood that housing 12 can be made from any suitable material as will occur to those of skill in the art and may be suitably formed to house and hold all components of device 10.

Device 10 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit-switched phone calls. Ear bud 26 can be used to listen to phone calls and other sound messages and microphone 28 can be used to speak into and input sound messages to device 10.

Figure 2:
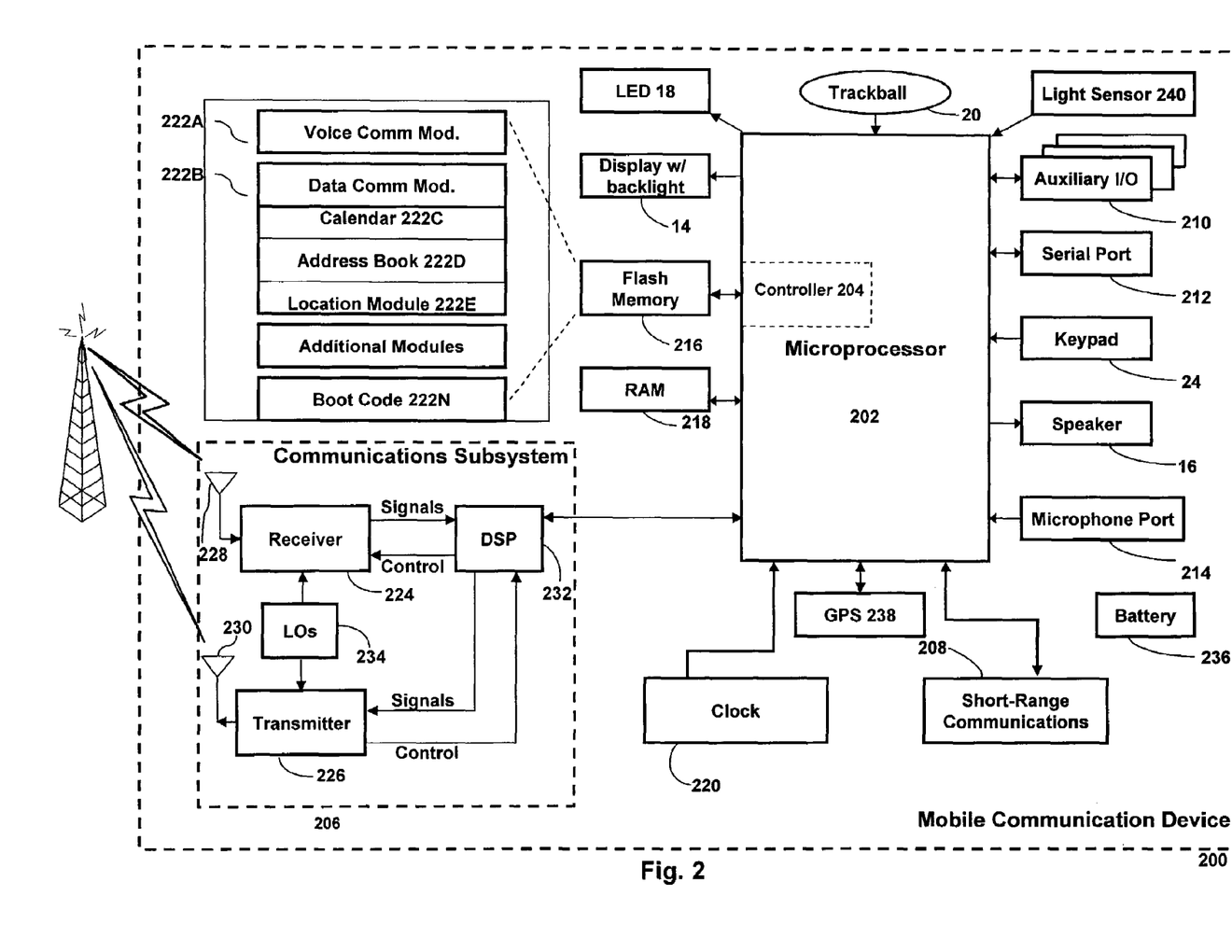
FIG. 2 is a block diagram of certain internal components including the memory device and the memory controller of the device in FIG. 1.

Referring to FIG. 2, functional components of device 10 are provided in schematic 200. The functional components are generally electronic, structural or electro-mechanical devices. In particular, microprocessor 202 is provided to control and receive almost all data, transmissions, inputs and outputs related to device 10. Microprocessor 202 is shown schematically as coupled to keypad 24, memory controller 204 and other internal devices. Microprocessor 202 preferably controls the overall operation of the device 10 and its components. Exemplary microprocessors for microprocessor 202 include Data 950 (trade-mark) series microprocessors and the 6200 series microprocessors, all available from Intel Corporation. Microprocessor 202 is connected to other elements in device 10 through a series of electrical connections to its various input and output pins. Microprocessor 202 has an IRQ input line which allows it to receive signals from various devices. Appropriate interrupt firmware is provided which receives and reacts to the signals detected on the IRQ line. Microprocessor 202 may have multiple IRQ input lines.

In addition to the microprocessor 202, other internal devices of the device 10 are shown schematically in FIG. 2. These include: display 14; speaker 16; keypad 24; communication sub-system 206; short-range communication sub-system 208; auxiliary I/O devices 210; serial port 212; microphone port 214 for microphone 28; flash memory 216 (which provides persistent storage of data); random access memory (RAM) 218; clock 220 and other device sub-systems (not shown). Device 10 is preferably a two-way radio frequency (RF) communication device having voice and data communication capabilities. In addition, device 10 preferably has the capability to communicate with other computer systems via the Internet.

Operating system software executed by the microprocessor 202 is preferably stored in a computer-readable medium, such as flash memory 216, but may be stored in other types of memory devices, such as read-only memory (ROM) or similar storage element. In addition, system software, specific device applications, or parts thereof, may be temporarily loaded into a volatile store, such as RAM 218. Communication signals received by the mobile device may also be stored to RAM 218.

Figure 3:
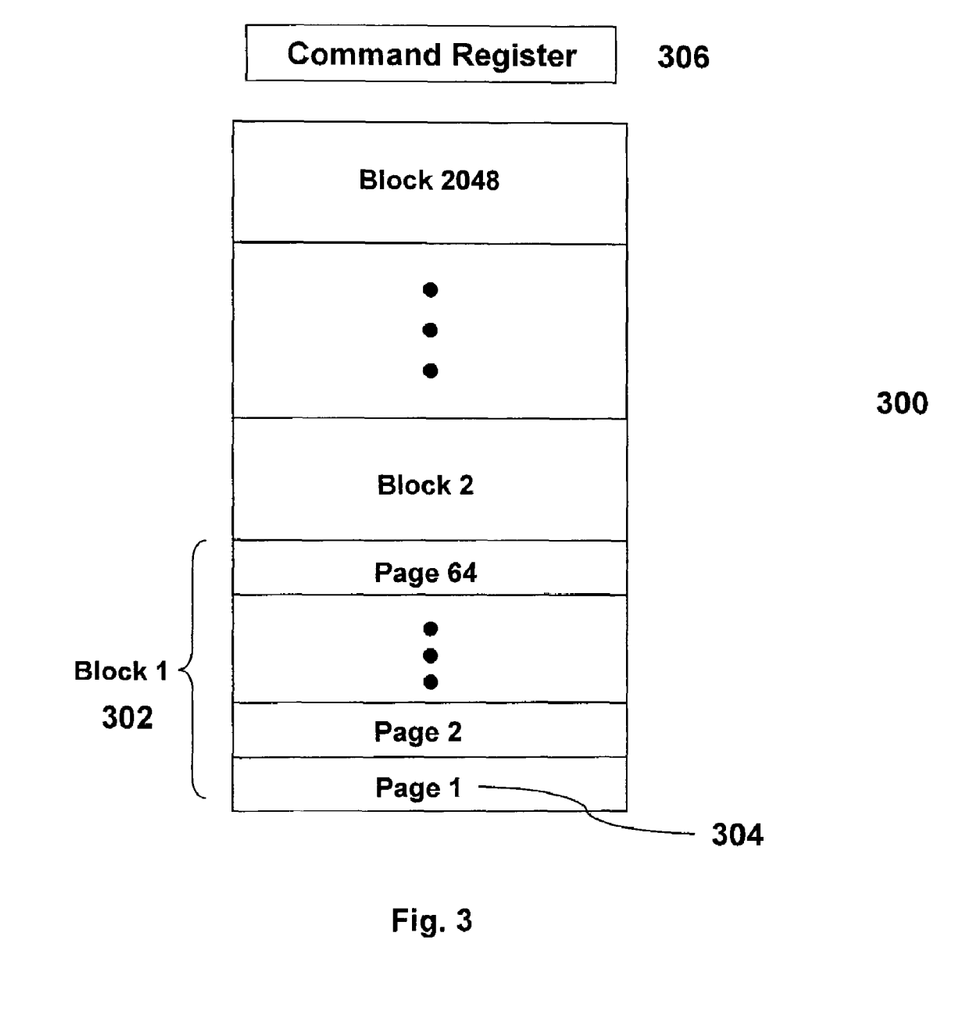
FIG. 3 is a block diagram of an exemplary mapping of memory sectors in the memory device of FIG. 1.

FIG. 3 shows memory diagram 300 of a typical 2-Gbit NAND flash memory 216. For an embodiment memory 216 is NAND-gate based. Typically, the memory of a NAND flash device is mapped as a sector-based (e.g. page-based) map.

This architecture is similar to a memory map of a hard-disk drive. Memory 216 is organized as a series of blocks 302; in this architecture, there are 2048 blocks. Each block 302 is further comprised of a series of pages 304 of memory. In this architecture there are 64 pages in each block. Each page 304 has a 2 Kbyte data area and a 64 byte spare area. Command register 306 is provided to receive process commands destined for any page. Register 306 has an internalized state-machine logic that receives commands and data on their pins, assesses the commands to perform their operations, e.g. read, program (write), and reset, and provide any data outputs. Also, it is common for NAND flash devices to use multiplexed address and data lines. Further detail on the command parameters and architectures of NAND flash devices is provided later.

Returning to FIG. 2, microprocessor 202, in addition to its operating system functions, enables execution of software applications on device 10. A set of software (or firmware) applications, generally identified as applications 222, that control basic device operations, such as voice communication module 222A and data communication module 222B, may be installed on the device 10 during manufacture or downloaded thereafter. As well, software modules, such as calendar module 222C, address book 222D and location module 222E. Additional modules such as personal information manager (PIM) application may be provided. Any module may be installed during manufacture or downloaded thereafter into device 10. Data associated with each application can be stored in flash memory 216.

Additionally any start-up, boot or low-level firmware or software code that is used to initiate or control device 10 (by execution on microprocessor 202) may be stored in memory 216. Such code is shown as boot code 222N.

Communication functions, including data and voice communications, are performed through the communication sub-system 206 and the short-range communication sub-system 208. Collectively, sub-systems 206 and 208 provide the signal-level interface for all communication technologies processed by device 10. Various applications 222 provide the operational controls to further process and log the communications. Communication sub-system 206 includes receiver 224, transmitter 226 and one or more antennas, illustrated as receive antenna 228 and transmit antenna 230. In addition, communication sub-system 206 also includes processing modules, such as digital signal processor (DSP) 232 and local oscillators (LOs) 234. The specific design and implementation of communication sub-system 206 is dependent upon the communication network in which device 10 is intended to operate. For example, communication sub-system 206 of device 10 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 10. In any event, communication sub-system 206 provides device 10 with the capability of communicating with other devices using various communication technologies, including instant messaging (IM) systems, text messaging (TM) systems and short message service (SMS) systems.

In addition to processing communication signals, DSP 232 provides control of receiver 224 and transmitter 226. For example, gains applied to communication signals in receiver 224 and transmitter 226 may be adaptively controlled through automatic gain-control algorithms implemented in DSP 232.

In a data communication mode, a received signal, such as a text message or Web page download, is processed by the communication sub-system 206 and is provided as an input to microprocessor 202. The received signal is then further processed by microprocessor 202 which can then generate an output to display 14 or to an auxiliary I/O device 210. A device user may also compose data items, such as e-mail messages, using keypad 24, trackball 20 and/or some other auxiliary I/O device 210, such as a touchpad, a rocker switch, a trackwheel or some other input device. The composed data items may then be transmitted over communication network 140 via communication sub-system 206. Sub-system 206 may also detect when it is out of communication range for its remote systems.

In a voice communication mode, overall operation of device 10 is substantially similar to the data communication mode, except that received signals are output to speaker 16, and signals for transmission are generated by microphone 28. Alternative voice or audio I/O sub-systems, such as a voice message recording sub-system, may also be implemented on device 10. In addition, display 14 may also be utilized in voice communication mode, for example, to display the identity of a calling party, the duration of a voice call, or other voice call-related information.

Short-range communication sub-system 208 enables communication between device 10 and other proximate systems or devices, which need not necessarily be similar devices. For example, the short-range communication sub-system may include an infrared device and associated circuits and components, or a Bluetooth (trade-mark) communication module to provide for communication with similarly enabled systems and devices.

Powering the entire electronics of the mobile handheld communication device is power source 236. In one embodiment, the power source 236 includes one or more batteries. In another embodiment, the power source 236 is a single battery pack, especially a rechargeable battery pack. A power switch (not shown) provides an "on/off" switch for device 10. A power source interface (not shown) may be provided in hardware, firmware, software or a combination of such elements to selectively control access of components in device 10 to power source 236. Upon activation of the power switch an application 222 is initiated to turn on device 10. Upon deactivation of the power switch, an application 222 is initiated to turn off device 10. Power to device 10 may also be controlled by other devices and by software applications 222.

Device 10 may also have global positioning system 238 to assist in identifying a present location of device 10 and may also have light sensor 240 to provide data on the ambient light conditions for device 10. These elements may be controlled by software operating on device 10 as described earlier.

Figure 4A:
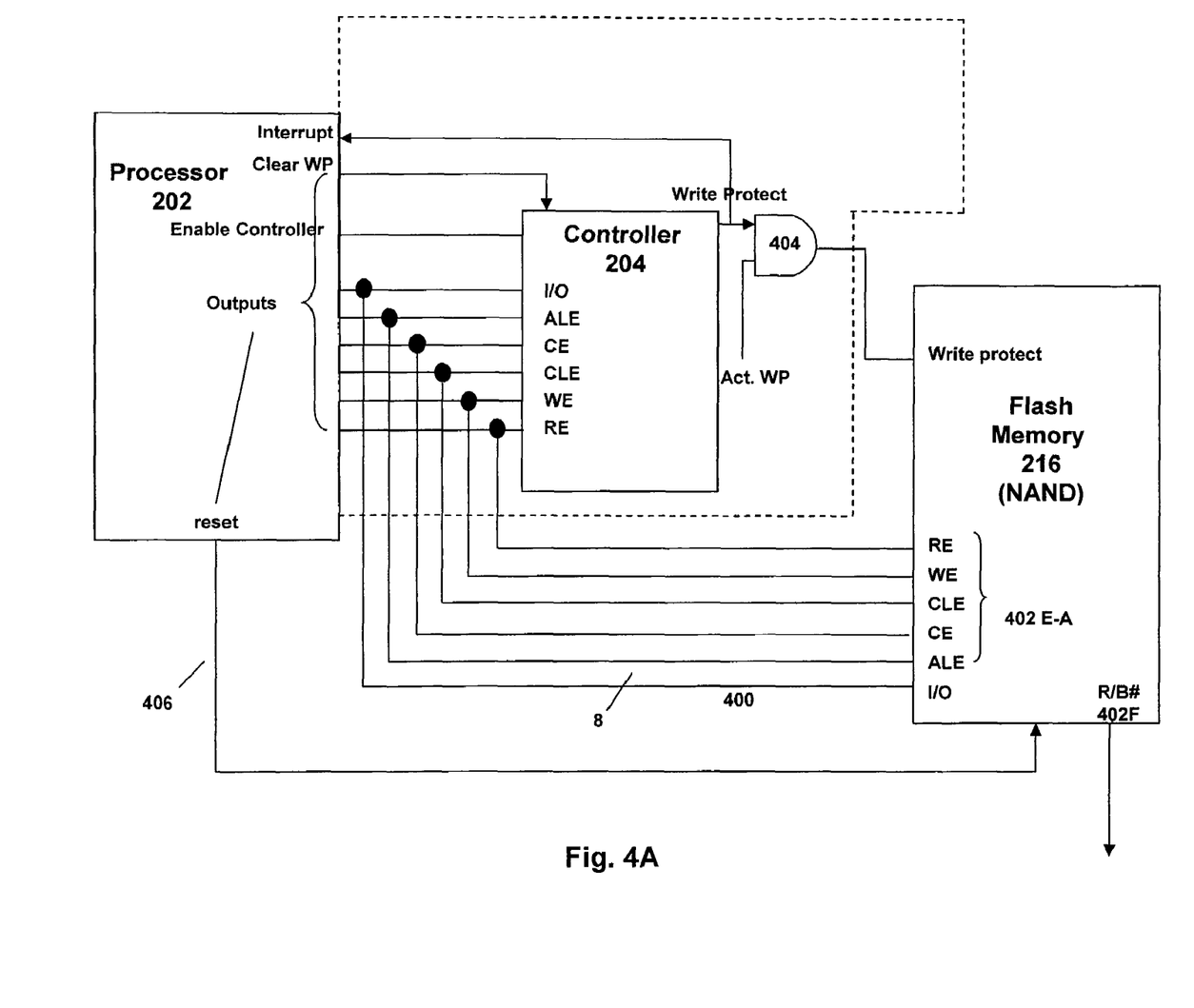
FIG. 4A is a block diagram of the memory controller connected to the memory device of FIG. 1 and its surrounding components.

Referring to FIG. 4A, further detail is now provided on how an embodiment manages access to sensitive sectors of memory 216 using memory controller 204. FIG. 4A shows signals and connections among microprocessor 202, controller 204 and memory 216. As is known, microprocessor 202, processes the software and firmware operating on device 10. A particular software program is typically compiled into a set of low-level machine-language instructions that are processed by microprocessor 202. The low-level instructions may provide individual output signals on individual output lines of microprocessor 202 and may evaluate signals on individual input lines of microprocessor 202. In executing part of the microcode generated from the software operating on microprocessor 202, microprocessor 202 asserts an instruction stream of output signals to its connected devices, including memory 216. Commands are asserted to memory 216 through its pins. Data can also be transferred between microprocessor 202 and memory 216 through the pins of memory 216. Additional control pins are provided on memory 216 to provide additional synchronization and control parameters for a command as it is asserted. When the signals are received at memory 216, various commands (e.g. write, read) are processed by the controller 306 (FIG. 3) of memory 216 to access or update its contents, according to the command provided.

Additional inputs to microprocessor 202 include signals provided to its interrupt lines. Triggering signals received thereon will automatically initiate execution of a pre-programmed interrupt routine associated with each interrupt line. An embodiment provides that an interrupt line can be controlled by an output of controller 204. This output can be used to flag microprocessor 202 that an illegal operation is being executed. As such, microprocessor 202, upon receipt of the signal, should abort this operation. After the operation is aborted, either the interrupt program or another program operating on microprocessor 202 can issue a clear WP signal to controller 204 to cancel the previously generated write protect signal generated by controller 204. Additional outputs from microprocessor 202 include a reset signal 406 and a write protect signal (both of which can simply be output lines of microprocessor 202 that have been dedicated to be such signals).

In the embodiment, memory 216 has its (input) write protect signal control signal controlled from an output of AND gate 404, which has a write protect signal generated by controller 204 and a separate activate write protect signal as its inputs. The latter signal may originate from microprocessor 202, controller 204 or from another circuit. The latter signal is used to force the write protect signal to be active on power-up of device 10 and to ensure that the contents of memory 216 are not modified during power up. Memory 216 may also receive the output reset signal from microprocessor 202 to control operation of memory 216. Controller 204 has an enable controller input signal, which may originate from microprocessor 202 or from a separate circuit. The Ready/Busy# signal from memory 216 may be used as an input to controller 204 and/or microprocessor 202. The write protect output may also be provided as an (interrupt) input to microprocessor 202.

A brief discussion is provided on the components of a command provided to memory 216. As noted earlier, NAND flash devices use multiplexed address and data lines in an I/O bus. As such, a command for memory 216 is broken down into a series of instruction cycles, where each cycle provides a different component of the command. Generally, a command is broken down into a command cycle, an address cycle, a data cycle and, if needed, a subsequent command cycle. Each part of the command is provided to memory 216 as a binary signal asserted on I/O bus 400. The duration of each cycle is determined by a clocking signal provided to one or more control pins of memory 216. The clocking signal may be a read or write signal, depending on the operation. Both memory 216 and microprocessor 202 have knowledge of the set of commands, and each command's structure and cycles, that can be asserted onto memory 216.

For example, consider microprocessor 202 issuing a command WRITE to memory page $01h$ the value of $00h$ for memory 216. The following exemplary cycles are used to assert the command. First, a WRITE command bit pattern instruction would be asserted on I/O bus 400. Command register 306 receives the signals from the I/O bus 400 and prepare memory 216 for the WRITE command. Next, microprocessor 202 would assert onto bus 400 a bit pattern to signify page $01h$ for the address cycle. Command register 306 would recognize the bit pattern as an address cycle in view of the earlier receipt of the WRITE command. Next, microprocessor would assert onto bus 400 a bit pattern to signify the value of $00h$ which is to be written into page $01h$. Similarly, command register 306 recognizes the bit pattern as the data that is to be written to page $01h$ and it internally causes page $01h$ to be updated accordingly. In other embodiments, variations on the number of cycles and the order of commands can be provided. Table A shows a summary of some commands.

TABLE A

| Command | Command Code (Cycle 1) | Number of Address Cycles | Data Cycles Required | Command (Cycle 2) | Valid During RE/Busy# |
| --- | --- | --- | --- | --- | --- |
| Page Read | 00h | 5 | No | 30h | No |
| Page Read Cache Mode Start | 31h | — | No | — | No |
| Page Read Cache Mode Start Last | 3Fh | — | No | — | No |
| Read for Internal Data Move | 00h | 5 | No | 35h | No |
| Random Data Read | 05h | 2 | No | E0h | No |
| Read ID | 90h | 1 | No | — | No |
| Read Status | 70h | — | No | — | No |
| Program Page | 80h | 5 | Yes | 10h | No |
| Program Page Cache Mode | 80h | 5 | Yes | 15h | No |
| Program for Internal Data Move | 85h | 5 | Optional | 10h | No |
| Random Data Input | 85h | 2 | Yes | — | No |
| Block Erase | 60h | 3 | No | D0h | No |
| Reset | FFh | — | No | — | Yes |

As noted earlier, as part of the execution of a command, control pins on memory 216 allow additional control signals to be provided for a command being processed or for the state of operation of memory 216. Such pins include: Address Latch Enable (ALE), Chip Enable (CE), Command Latch Enable (CLE), Write Enable (WE) and, Read Enable (RE) shown as grouped signals 402A-E. Ready/Busy# pin is shown as pin 402F. Following signal labelling conventions, any signal having an "#" as a suffix has a "low" value assertion. The following Table B provides a summary of functions of pins of memory 216.

In order to control access to protected areas, controller 202 monitors the I/O lines 400 and reads the binary commands as they are being asserted and the other command as they are being asserted on the lines 402A-E for relevant modification commands being sent to memory 216. In most system architectures, such signals would be emanating from microprocessor 202 as it executes commands that attempt to modify the contents of a memory location in memory 216, such as a write, program, set or clear command. Other architectures

TABLE B

| Pin Name | Pin Function |
| --- | --- |
| $I/O_0 \sim I/O_7$ | Data Inputs/Outputs<br>Microprocessor 202 asserts these I/O pins to represent a binary-based signal representing an input command, address and data, and to output data during read operations. The I/O pins can float to a high impedance when memory 216 is deselected or when its outputs are disabled. |
| CLE | Command Latch Enable<br>The CLE input controls the activating path for commands sent to command register 306. When active, commands are latched into the command register through the I/O ports with the assertion of the rising edge of the WE# signal. |
| CE | Chip Enable<br>The CE input provides selection control for memory 216. When memory 216 is in the Busy state, CE high is ignored, and memory 216 does not return to standby mode in program or erase operation. If it is not asserted memory 216 is in standby mode and does not respond to any control signals provided on I/O pins. |
| RE | Read Enable<br>The RE input is the serial data-out control. When active, memory 216 drives the data onto the I/O bus. Data is valid after the falling edge of RE. |
| WE | Write Enable<br>The WE input controls writes to the I/O port. Commands, addresses and data can be latched into memory 216 on the rising edge of the WE pulse. |
| WP | Write Protect<br>The WP pin provides inadvertent write/erase protection during power transitions. The internal high voltage generator is reset when the WP pin is active. |
| R/B# | Ready/Busy# Output<br>The R/B output indicates the status of operation of memory 216. When low, it indicates that a program, erase or random read operation is in process and returns to high state upon completion. It is an open drain output and does not float to a high-impedance state condition when memory 216 is deselected or when outputs are disabled. |

For example, for a WRITE command to be processed, the following control pins must have the following signals asserted on them (from microprocessor 202): CE# should be driven low and CLE should be driven high while issuing a WE# clock signal. Note that commands, address, or data are clocked into the NAND device on the rising edge of the WE# signal. For a program (write) operation, after the command and address information is supplied to the I/O lines, data can be provided to the byte addresses that are to be programmed to a desired value. In the previously erased blocks may have their bits reset to zero or 1.

With the architecture and command protocol of NAND memory 216 described, further detail is now provided on controlling access to certain segments in memory 216. In addition to the signal flow between microprocessor 202 and memory 216, controller 204 connects on the bus of signals therebetween and provides a decoding and analysis logic to determine when command signals from microprocessor 202 are allowed to be provided to memory 216.

As noted earlier, device 10 may have a boot sector storing boot code 222N therein. The boot sector may reside in one or more pages of memory 216. Other sensitive data may be stored in other areas, which may or may not be contiguous pages and/or blocks. Protectable memory may include initiation code, such as boot code or sensitive data.

may have other modules or additional microprocessors providing such signals to memory 216. If a restricted, or potentially restricted, command is detected, then the controller 202 may selectively block the command from being asserted. Alternatively or additionally controller 202 may disable or may inhibit memory 216, thereby preventing activation of the command on memory 216. Additionally or alternatively, an interrupt signal may be generated by controller 204 and may be sent to microprocessor 202 to initiate an interrupt routine to abort the illegal instruction. Once the illegal instruction is aborted, microprocessor 202 may issue a write protect clear command to reset controller 204, allowing it to start a new round for monitoring instructions.

Controller 204 is in communication with signals from microprocessor 202. The main memory control signals for memory 216 are provided in parallel to controller 204 and memory 216. An additional control signal from controller 204 is provided to both microprocessor 202 and a write protect pin of memory 216 (through AND gate 404).

Controller 204 is shown as being embedded within microprocessor 202 by the dotted line. However, other embodiments may have controller 204 implemented as a module or system outside of microprocessor 202. Controller 204 may be implemented as a series of discrete logic elements, an application specific integrated circuit (ASIC), a programmable logic device (PLD) or other custom or programmable devices. Parts or all of the function of controller 204 may also be implemented in software and/or firmware operating on a specific microprocessor. In such an embodiment, the microprocessor itself can monitor for a program operating on it that issues a restricted command to a restricted address for memory 216.

Figure 4B:
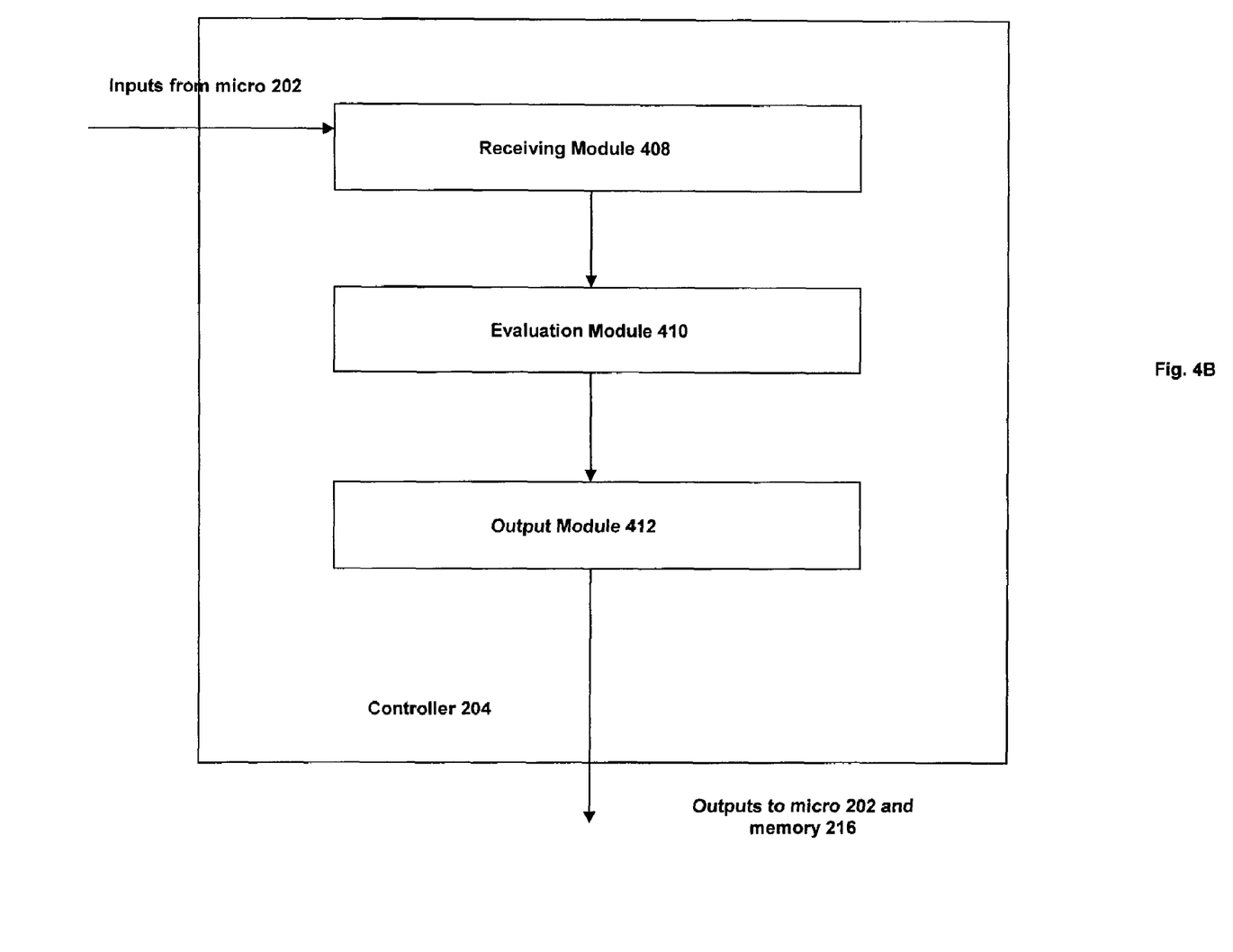
FIG. 4B is a block diagram of the memory controller of FIG. 4A.

Referring to FIG. 4B, it will be appreciated that the processing of bit patterns provided on the input lines of memory 216 can be implemented using several modules or components in controller 204. One embodiment has a first module 408 to receive each bit pattern. Patterns can be received into first module 408 via a clocking signal that is synchronized to the clocking signal for cycles of commands provided to memory 216. Next, the received bit pattern can be provided to assessment module 410 that decodes the bit pattern to determine whether the bit pattern matches a part of a command or not. If not, then the next bit pattern can be analyzed. In making the comparison, the module may have a hard-coded set of tests to represent each of the restricted commands. Alternatively such comparisons can be made in software, allowing a database of commands to be maintained. If the command is a restricted command then a further evaluation may be conducted to determine whether there are only local restrictions on the command (e.g., if the command is being asserted on a specific memory location). Once it is determined that a command is to be inhibited, then output module 412 generates one or more signals that are connected to one or more output lines on controller 202. Each output line is connected to a control line of memory 216, an input line to microprocessor 202 or an interrupt line to microprocessor 202. A signal asserted to a specific input line on memory 216 is predetermined to have the intended control effect for device 216. For example, if an output is connected to the write protect pin of memory 216, then when the signal is asserted, the write protect feature of memory 216 is enabled, thereby inhibiting any write instructions from being effected on memory 216 as long as the signal is asserted. Similarly, any interrupt line that is asserted will cause a related interrupt routine to be executed on microprocessor 202.

Additionally, microprocessor 202 itself may directly or indirectly inhibit access to memory 216. For example, an output line of microprocessor 202 may be designated to be a write protect signal. Software operating on microprocessor may be provided to internally monitor for restricted commands as noted above. If a restricted command (accessing a restricted address) is detected, then the software can assert the clear write protect line. The output of the write protect line may be provided directly to memory 216. Alternatively or additionally it may be provided to controller 204, which can then generate its own output signal, such as write protect signal, which is then provided to memory 216 through gate 404. As noted earlier, if controller 204 detects an illegal instruction, it may assert the write protect output signal and a corresponding interrupt is generated on microprocessor 202. Afterwards the microprocessor 202 may issue a write protect clear command to reset controller 204.

Figure 5:
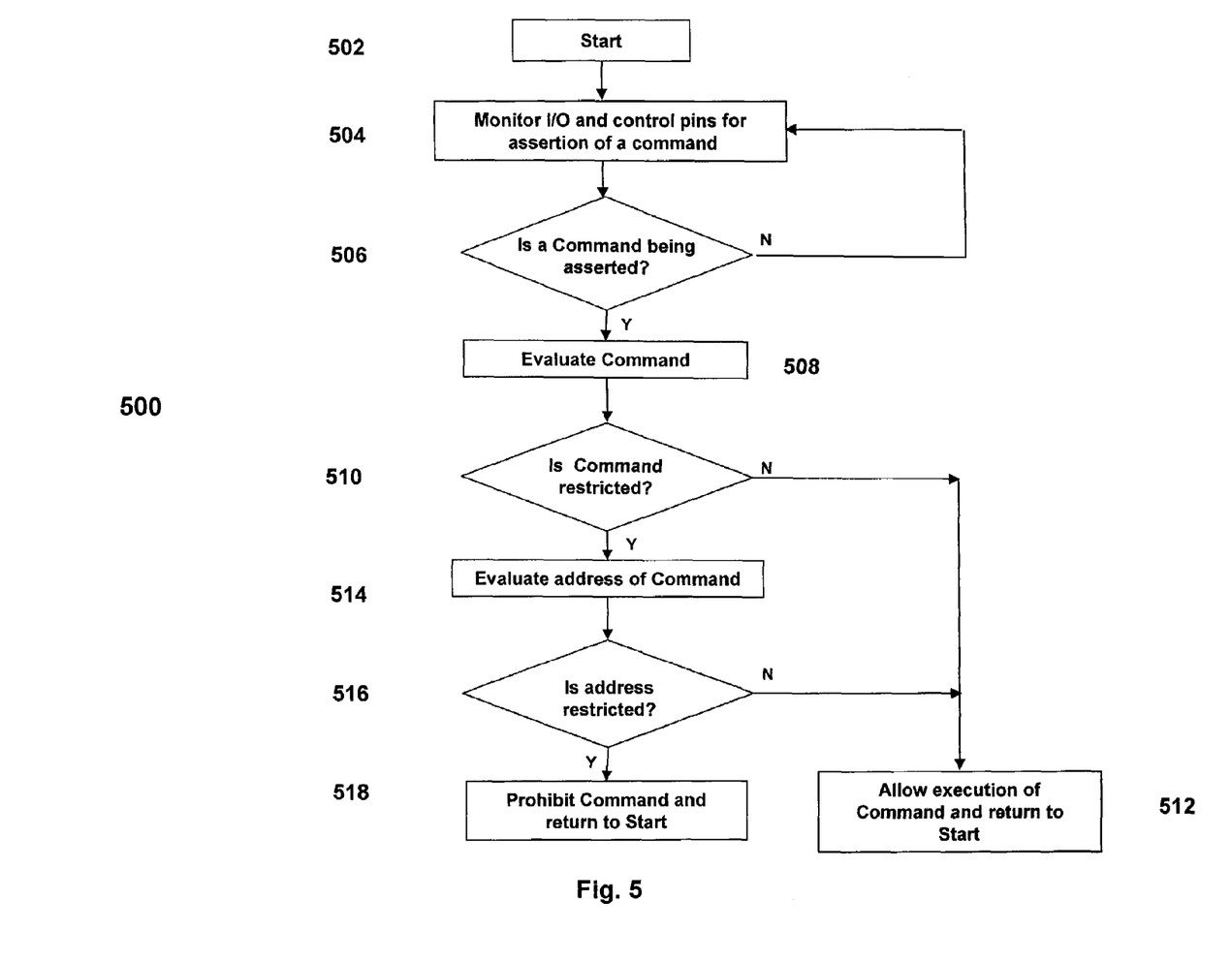
FIG. 5 is a flowchart of exemplary steps executed by the embodiment of FIG. 1 in controlling access to the memory device.

Referring to FIG. 5, flow chart 500 shows a process used to evaluate commands and prohibit execution of restricted commands where they are affecting restricted memory locations.

In operation, controller 204 monitors for appearance on I/O bus 400 of a binary signal representing command. See steps 502, 504 and 506.

In steps 508 and 510, once a command is recognized as being requested, the signals are analyzed to determine if the command modifies the contents of a memory location, e.g., write, program, clear or set command. If the command does not, then the command is allowed to continue through the remainder of its cycle. Then controller 204 waits for the issuance of the next command. See Step 512. In other embodiments, a non-restricted command may be identified as such by several methods, including: explicitly marking the command as a non-restricted command, not marking the command as anything (and also explicitly marking restricted commands as such).

However, if the command is a restricted command, then the controller continues to monitor the command as it progresses through the remainder of its cycle. When the address is asserted for the restricted command, controller 202 reads the address and compares it against a database of restricted addresses. If the read address matches a restricted address then it is determined that a restricted command is attempting to write to a restricted memory location. As such, the command is inhibited from being asserted onto the memory location in memory 216. See steps 514, 516 and 518. As with the marking of non-restricted commands, a restricted command may be identified as such by several methods, including: explicitly marking the command as a restricted command, not marking the command as anything (and also explicitly marking non-restricted commands as such). Tests and processes can be deployed to identify and process restricted and non-restricted commands based on a predetermined marking algorithm for each and a detection system to evaluate such markings for commands.

There are several methods to inhibit the command the controller can activate a restricted signal that is provided as an input to microprocessor 202. The input may be to an interrupt line of microprocessor 202 and a software routine may be provided to react to the interrupt signal. The restricted signal is also provided to AND gate 404 which produces an output based on a power signal (normally asserted). The output is provided to the write protect pin of memory 216. While the write protect pin is asserted, no program commands or erase commands can be executed on memory 216. An additional or alternative method of blocking the command is to control one or more of the CE and WE inputs to inhibit acceptance of a command. See Table A for values.

In another embodiment, all signals from microprocessor 202 are provided through controller 204. As such, controller 204 can then selectively allow or not allow or change the value of certain assertions, depending on the analysis of the commands as processed by controller 204.

It will be appreciated that other commands, such as the read command asserted on RE, may be a restricted command. An additional test can be provided to detect such commands and block their effect, following a modified monitoring and assessment approach described above.

Details on another feature of an embodiment are now provided. Aside from monitoring and selectively prohibiting a command from being asserted on a memory device, an embodiment also allows the monitoring process to be selectively activated or deactivated.

In some instances, it is useful to selectively allow a command to be asserted on device 216, but after a certain condition, the command may be inhibited from being asserted. For example for a boot sector block restriction, it may be preferable to only inhibit assertion of a write command on the boot sector for memory devices installed on production models for an electronic device. Until development of the production model is "set", various features and designs for the electronic device may be in flux. This may include the boot software that is stored in the boot sector of the memory device. As such, legitimate changes may be made to the code, requiring that the boot sector updateable. Such changes may be implemented by downloading updated software into the boot sector, requiring that the download process have write-access to the boot sector.

It will be appreciated that there are several methods of implementing selective activation of the controller. For example, referring to FIG. 4A, the write protect input pin of memory 216 can be selectively controlled by an output of AND gate 404, which in turn is controlled by an output signal from controller 204 and an activate write protect signal. The latter signal may originate from microprocessor 202, controller 204 or a separate circuit. For AND gate 404, the input values should be managed to provide timely write protect signals to memory 216 (e.g., asserted only when restricted commands are to be inhibited). Use of a fuse provide a more tamper-resistant method of ensuring that the write protect feature is fully enabled. However, other implementations may provide hardware switches and jumpers to indicate whether or not the controller is activated.

In other embodiments certain microprocessor 202 may be used, such as those in the Qualcomm (trademark) or Free Scale (trademark) chip sets. Such microprocessors have programmable one-time fuses that can be selectively blown. When the fuse is blown or not blown, the software can recognize the state of development of the device, then selectively activate or not activate controller 202.

The present invention is defined by the claims appended hereto, with the foregoing description being merely illustrative of embodiments of the invention. Those of ordinary skill may envisage certain modifications to the foregoing embodiments which, although not explicitly discussed herein, do not depart from the scope of the invention, as defined by the appended claims.

I claim:

1. A method for controlling assertion of a command to a NAND memory device in an electronic device, said NAND memory device storing operating system software for said electronic device, said method comprising:
   during powering up of said device applying a write protect signal to a write protect pin on said NAND memory device;
   after powering up said device, monitoring an instruction stream destined for said memory device for an assertion of a command for said NAND memory device; and
   upon detection of said command
      if said command does not modify contents in said NAND memory device, then allowing processing of said command to continue; and
      if said command does modify contents in said NAND memory device, then
         evaluating a destination address associated with said command;
         if said destination address is not a restricted address for said memory device, then allowing processing of said command to continue; and
         if said destination address is a restricted address for said NAND memory device, then preventing assertion of said command on said NAND memory device.

2. The method for controlling assertion of a command to a NAND memory device in an electronic device as claimed in claim 1, wherein if said command is a restricted command, said write protect pin on said memory device is asserted to prevent said command from being asserted on said NAND memory device.

3. The method for controlling assertion of a command to a NAND memory device in an electronic device as claimed in claim 1, wherein said restricted address contains data related to initiation instructions for said electronic device.

4. The method for controlling assertion of a command to a NAND memory device in an electronic device as claimed in claim 1, wherein said method is selectively activated and deactivated.

5. The method for controlling assertion of a command to a NAND memory device in an electronic device as claimed in claim 4, wherein said method is executed entirely on a microprocessor operating on said electronic device.

6. A controller for monitoring for assertion of a command to a NAND memory device in an electronic device, said NAND memory device storing operating system software for said electronic device, said controller comprising:
   a monitoring module to monitor an instruction stream for a command, said stream generated by a microprocessor in said device and said stream destined for said NAND memory device;
   an evaluation module that is configured, after said command is detected,
      to determine whether said command modifies contents of said NAND memory device;
      if said command does not update said data in said memory device, then to allow processing of said command to continue; and
      if said command does update said data in said NAND memory device, then
         to indicate that said command is not a restricted command, if said destination address is not a restricted address for said NAND memory device; and
         to identify said command as said restricted command, if said destination address is said restricted address for said NAND memory device;
   an output module that is configured to generate a signal for assertion against said NAND memory device to prevent assertion of said command on said memory device when said command is identified as said restricted command; and
   a write protect module to generate a write protect signal that is applied to a write protect pin on said NAND memory device during said powering up of said device.

7. The controller for monitoring for assertion of a command to a NAND memory device in an electronic device as claimed in claim 6, wherein said output module generates a signal for said write protect pin on said memory device to prevent said command from being asserted on said NAND memory device if said command is a restricted command.

8. The controller for monitoring for assertion of a command to a NAND memory device in an electronic device as claimed in claim 6, wherein said restricted address relates to protected areas of information for said electronic device.

9. The controller for monitoring for assertion of a command to a NAND memory device in an electronic device as claimed in claim 8, wherein said controller is selectively activated and deactivated.

10. The controller for monitoring for assertion of a command to a NAND memory device in an electronic device as claimed in claim 9, wherein a fuse in said microprocessor is selectively blown to selectively activate said controller.

11. A method for controlling assertion of a command to a NAND memory device in a production model of an electronic device, the method comprising:
   applying a write protect signal to a write protect pin on said NAND memory device during powering up of said device;

after said device is powered up, monitoring an instruction stream destined for said NAND memory device for an assertion of a command for said NAND memory device; and upon detection of said command
- if said command does not modify contents in said NAND memory device, then allowing processing of said command to continue; and
- if said command does modify contents in said NAND memory device, then
  - evaluating a destination address associated with said command;
  - if said destination address is not a restricted address for said NAND memory device, then allowing processing of said command to continue; and
  - if said destination address is a restricted address for said NAND memory device, then preventing assertion of said command on said NAND memory device.

12. The method as claimed in claim 11, wherein said electronic device is a portable communication device.

13. The method as claimed in claim 11, wherein said preventing assertion of said command comprises asserting a signal on said write protect pin on said NAND memory device.

14. The method as claimed in claim 11, wherein said restricted address contains data related to an initiation instruction for said electronic device.

15. The method as claimed in claim 11, wherein said method is executed on said device only if said device is said production model.

16. The method as claimed in claim 15, wherein said microprocessor contains a fuse which is used to indicate whether said device is said production device and said method further comprises evaluating a status of said fuse to determine if said device is said production device.

17. The method as claimed in claim 11, wherein said method is executed entirely on a microprocessor operating on said electronic device.

* * * * *